(12) United States Patent
Liu et al.

(10) Patent No.: US 10,371,446 B2
(45) Date of Patent: Aug. 6, 2019

(54) POT FURNACE FOR CALCINING PETROLEUM COKE AT LOW TEMPERATURE

(71) Applicant: CHINA ALUMINUM INTERNATIONAL ENGINEERING CORPORATION LIMITED, Beijing (CN)

(72) Inventors: Chaodong Liu, Liaoning (CN); Shanhong Zhou, Liaoning (CN); Haifei Xu, Liaoning (CN); Pai Lv, Liaoning (CN); Yi Sun, Liaoning (CN); Yinhe Cui, Liaoning (CN)

(73) Assignee: CHINA ALUMINUM INTERNATIONAL ENGINEERING CORPORATION LIMITED, Beijing (CN)

( * ) Notice: Subject to any disclaimer, the term of this patent is extended or adjusted under 35 U.S.C. 154(b) by 6 days.

(21) Appl. No.: 15/510,380

(22) PCT Filed: Sep. 10, 2015

(86) PCT No.: PCT/CN2015/089351
§ 371 (c)(1),
(2) Date: Mar. 10, 2017

(87) PCT Pub. No.: WO2016/037583
PCT Pub. Date: Mar. 17, 2016

(65) Prior Publication Data
US 2017/0261262 A1    Sep. 14, 2017

(30) Foreign Application Priority Data
Sep. 10, 2014 (CN) .................... 2014 2 0514728 U

(51) Int. Cl.
*F27B 14/08* (2006.01)
*C10B 57/00* (2006.01)
(Continued)

(52) U.S. Cl.
CPC ............... *F27B 14/08* (2013.01); *B01J 6/001* (2013.01); *C01B 32/05* (2017.08); *C10B 57/005* (2013.01);
(Continued)

(58) Field of Classification Search
CPC .......... F27B 14/08; F27B 14/04; F27B 14/14; F27D 7/06
See application file for complete search history.

(56) References Cited

U.S. PATENT DOCUMENTS

| | | | | |
|---|---|---|---|---|
| 3,256,173 A | * | 6/1966 | Wittner ..................... | C25C 3/08 204/247.3 |
| 4,619,750 A | * | 10/1986 | Bessard .................. | C25C 3/085 204/247.3 |
| 2017/0260455 A1 | * | 9/2017 | Liu ......................... | C01B 31/02 |

FOREIGN PATENT DOCUMENTS

| CN | 201138137 Y | * | 10/2008 |
|---|---|---|---|
| CN | 201190106 Y | * | 2/2009 |

(Continued)

OTHER PUBLICATIONS

CN201190106Y—machine translation.*
(Continued)

*Primary Examiner* — Nathaniel Herzfeld
(74) *Attorney, Agent, or Firm* — Cantor Colburn LLP

(57) ABSTRACT

A pot furnace for calcining petroleum coke at low temperature may include a pot, and a cooling water jacket and a flame path below the pot. The flame path may include eight layers. An inlet of a first flame path layer may be in communication with a volatile channel in the front wall, and (Continued)

is provided with a first flame path layer flashboard An eighth flame path layer may be in communication with a communication flue. Flue gas may be discharged out of the furnace body through a main flue. A furnace bottom cooling channel may be provided below the eighth flame path layer.

4 Claims, 1 Drawing Sheet

(51) Int. Cl.
    *F27B 14/04*     (2006.01)
    *F27B 14/14*     (2006.01)
    *F27D 7/06*     (2006.01)
    *F27D 9/00*     (2006.01)
    *B01J 6/00*     (2006.01)
    *C01B 32/05*     (2017.01)

(52) U.S. Cl.
    CPC .............. *F27B 14/04* (2013.01); *F27B 14/14* (2013.01); *F27D 7/06* (2013.01); *F27D 9/00* (2013.01); *F27B 2014/045* (2013.01); *F27D 2007/066* (2013.01); *F27D 2009/0013* (2013.01); *F27M 2001/045* (2013.01); *F27M 2003/03* (2013.01); *Y02P 20/129* (2015.11)

(56) References Cited

FOREIGN PATENT DOCUMENTS

| CN | 201313819 Y | | 9/2009 |
| CN | 101585524 A | * | 11/2009 |
| CN | 101792135 A | | 8/2010 |
| CN | 102829626 A | | 12/2012 |
| CN | 102976309 A | | 3/2013 |
| CN | 203451226 U | | 2/2014 |
| CN | 204111322 U | | 1/2015 |

OTHER PUBLICATIONS

CN201138137Y—machine translation.*
International Search Report for PCT/CN2015/089351 International Application; dated Dec. 15, 2015.

* cited by examiner

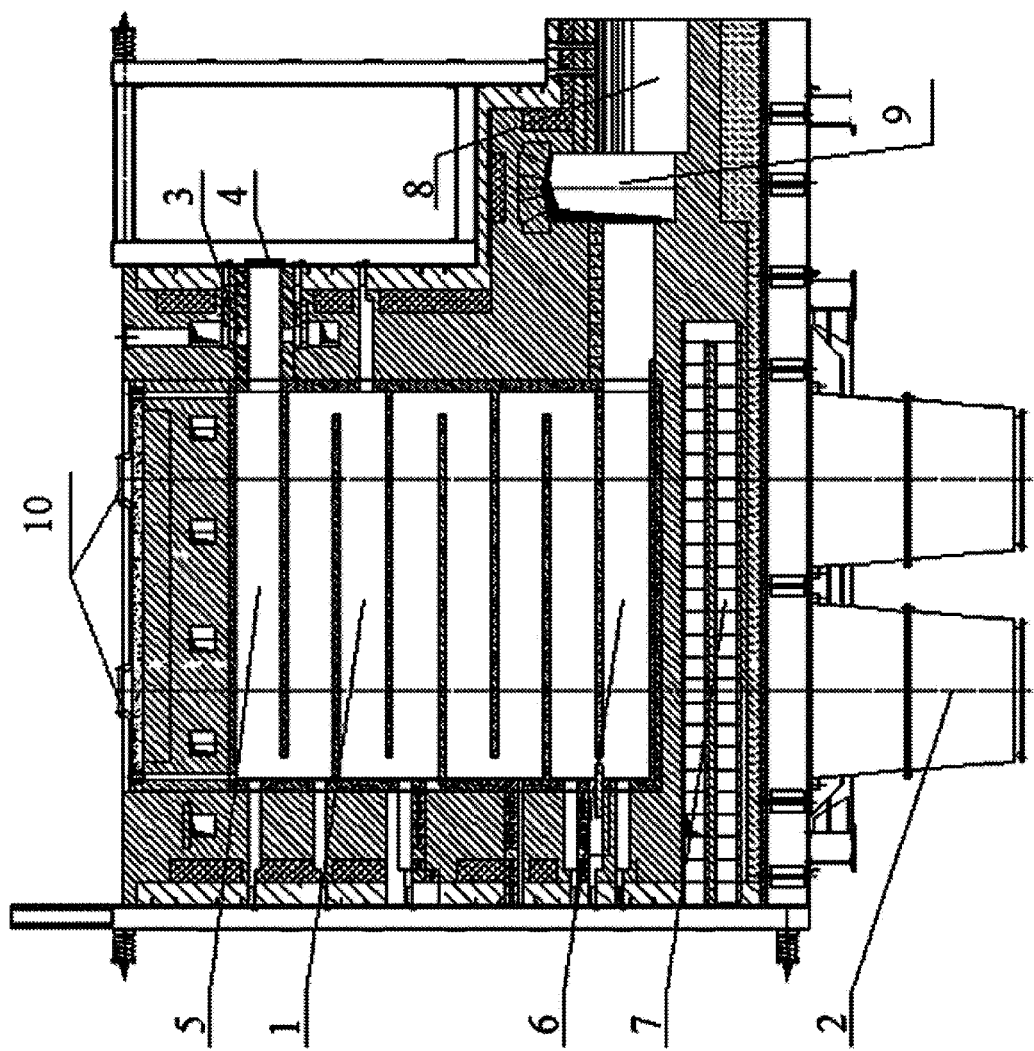

POT FURNACE FOR CALCINING PETROLEUM COKE AT LOW TEMPERATURE

This is the U.S. national stage of application No. PCT/CN2015/089351, filed on Sep. 10, 2015. Priority under 35 U.S.C. § 119(a) and 35 U.S.C. § 365(b) is claimed from Chinese Application No. 201420514728.1, filed Sep. 10, 2014, the disclosure of which is also incorporated herein by reference.

TECHNICAL FIELD

The present invention relates to a pot furnace for calcining petroleum coke at low temperatures, and in particular to a pot furnace for calcining petroleum coke at low temperature for producing anode, cathode and electrode for aluminum in the carbon industry, and for use in the special carbon industry.

BACKGROUND ART

Due to large-scale electrolytic bath's higher requirements for the quality of the pre-baked anode and control of the anode production cost, most enterprises use pot furnaces to calcine petroleum coke. The advantages of pot furnaces in calcined coke quality and yield become more evident. This is mainly because during calcination in the pot furnace the petroleum coke is heated indirectly by high temperature gas, has a high calcination temperature and has a long calcination time. The calcination temperature can reach 1250° C.~1350° C.; the discharge speed is generally about 100 kg/h; the true density of the calcined coke can reach about 2.08~2.10 g/cm3; and carbon burning loss during the calcination is only 3~4%.

However, with the decline in the quality of petroleum coke products of petrochemical enterprises, as well as purchase of low-cost high-sulfur coke in great amounts by enterprises to reduce the production cost of calcined coke, the sulfur content in the petroleum coke calcined in pot furnaces increases significantly, which brings about a series of problems:

1) Sulfur in petroleum coke corrodes the silicon brick of the body of the pot furnace in the high temperature calcination process, resulting in reduced service life of the silicon brick and thus a direct reduction in the service life of the pot furnace. The service life of pot furnaces could reach 10 years in the past, but with the use of high-sulfur coke, the service life decreases directly to 3 to 4 years; and 2) Sulfur which precipitates during high temperature calcination enters the flue gas and generates SO2, leading to a sharp increase in the concentration of SO2 in the flue gas, even up to 4000~6000 mg/Nm3 in some cases. This not only reduces the service life of the smoke exhaust system equipment, but also greatly increases the difficulty and cost of desulfurization.

SUMMARY OF THE INVENTION

In order to solve the aforesaid problems, the present invention proposes a pot furnace for calcining petroleum coke at low temperature, which aims to preserve the advantages of existing pot furnaces and reduce the adverse effect of high sulfur coke on the furnace service life and flue gas desulfurization, while ensuring the quality of the calcined coke.

To achieve this purpose, the present invention a pot furnace for calcining petroleum coke at low temperature comprises a pot, and a cooling water jacket and a flame path below the pot. The flame path totally includes eight layers. The inlet of the first flame path layer 5 is in communication with the volatile channel in the front wall, and is provided with a first flame path layer flashboard. The eighth flame path layer is in communication with the communication flue. The flue gas is discharged out of the furnace body through the main flue. A furnace bottom cooling channel is provided below the eighth flame path layer.

The temperature of the first flame path layer is 1000-1200° C., the temperature of the second flame path layer is 1100-1250° C., the temperature of the third flame path layer is 1100-1200° C., the temperature of the fourth flame path layer is 1100-1200° C., the temperature of the fifth flame path layer is 1000-1150° C., the temperature of the sixth flame path layer is 1000-1150° C., the temperature of the seventh flame path layer is 900-1100° C., the temperature of the eighth flame path layer is 900-1100° C., and the exhaust smoke temperature is below 1000° C.

The first flame path layer flashboard controls the amount of cold air into the flame path.

Air within the furnace bottom cooling channel is discharged directly, without participating in supporting the combustion within the flame path.

The negative pressure in the main flue reaches −250 Pa~−300 Pa, the negative pressure in the eighth flame path layer reaches −120 Pa~−150 Pa, and the negative pressure in the first flame path layer reaches −30 Pa~−40 Pa.

The present invention has the following advantageous effects. The petroleum coke volatiles enter the main flame path from the first flame path layer and exit from the eighth flame path layer into the main flue. It prevents the phenomenon of over-calcination which might happen when producing calcined coke for pre-baked anode with a pot furnace, by using cold air for supporting the combustion, by dispensing with the preheated air and by appropriately reducing the flame path temperature. A relatively low calcination temperature reduces the desulfurization amount in the petroleum coke calcination process, reduces the sulfur dioxide content in the flue gas and the pressure of flue gas purification. A reduction in the temperature of the furnace body slows down the corrosion of the silicon brick by sulfur in the petroleum coke and increases the service life of the furnace body in the case of calcination of high-sulfur coke in the pot furnace.

BRIEF DESCRIPTION OF THE DRAWING

FIG. 1 is a cross-sectional view of the flame path portion of the pot furnace of the present invention.

In the FIGURE:
1 flame path,
2 cooling water jacket,
3 volatile channel,
4 the first flame path layer flashboard,
5 the first flame path layer,
6 the eighth flame path layer,
7 furnace bottom cooling channel,
8 main flue,
9 communication flue,
10 pots.

Embodiments

The present invention will be described below in detail with reference to the embodiments, which, however, do not limit the protection scope of the present invention.

The pot furnace for calcining petroleum coke at low temperatures as shown in FIG. 1 comprises a pot 10, and a cooling water jacket 2 and a flame path 1 below the pot 10. The flame path includes eight layers. The inlet of a first flame path layer 5 is in communication with a volatile channel 3 in the front wall, and is provided with a first flame path layer flashboard 4. An eighth flame path layer 6 is in communication with a communication flue 9. The flue gas is discharged out of the furnace body through a main flue 8. A furnace bottom cooling channel 7 is provided below the eighth flame path layer 6.

The temperature of the first flame path layer is 1000-1200° C., the temperature of the second flame path layer is 1100-1250° C., the temperature of the third flame path layer is 1100-1200° C., the temperature of the fourth flame path layer is 1100-1200° C., the temperature of the fifth flame path layer is 1000-1150° C., the temperature of the sixth flame path layer is 1000-1150° C., the temperature of the seventh flame path layer is 900-1100° C., the temperature of the eighth flame path layer is 900-1100° C., and the exhaust smoke temperature is below 1000° C.

The first flame path layer flashboard 4 controls the amount of cold air into the flame path.

Preheated air within the furnace bottom cooling channel 7 is discharged directly, without participating in supporting the combustion in the flame path.

The negative pressure in the main flue 8 reaches −250 Pa~−300Pa, the negative pressure in the eighth flame path layer reaches −120 Pa~−150 Pa, and the negative pressure in the first flame path layer reaches −30 Pa~−40 Pa. A sufficiently large negative pressure ensures that sufficient cold air enters the flame path and reduces the temperature in the flame path. Meanwhile, a great negative pressure can improve the uniformity of temperatures in all flame path layers.

The calcination material petroleum coke in the pots 10 comes from top to bottom to undergo the whole calcination process. The high temperature flue gas flows in the flame path 1 to realize indirect heating of the petroleum coke, before being cooled by the cooling water jacket 2.

Cold air in the environment is sucked directly into the flame path through the first flame path layer as a result of the negative pressure in the flame path to support the combustion, ensuring that the temperature in the flame path is below 1250° C.

The invention claimed is:

1. A pot furnace for calcining petroleum coke at low temperature, comprising a pot, and a cooling water jacket and a flame path below the pot, characterized in that the flame path includes eight layers; an inlet of a first flame path layer 5 is in communication with a volatile channel in the front wall, and is provided with a first flame path layer flashboard; an eighth flame path layer is in communication with a communication flue; flue gas is discharged out of the furnace body through a main flue; and a furnace bottom cooling channel is provided below the eighth flame path layer, wherein the first flame path layer flashboard is configured for controlling the amount of cold air into the flame path, and only the cold air supports the combustion during operation, and no preheated air flows into the flame path or supports the combustion during operation.

2. The pot furnace for calcining petroleum coke at low temperature according to claim 1, characterized in that the temperature of the first flame path layer is 1000-1200° C., the temperature of the second flame path layer is 1100-1250° C., the temperature of the third flame path layer is 1100-1200° C., the temperature of the fourth flame path layer is 1100-1200° C., the temperature of the fifth flame path layer is 1000-1150° C., the temperature of the sixth flame path layer is 1000-1150° C., the temperature of the seventh flame path layer is 900-1100° C., the temperature of the eighth flame path layer is 900-1100° C., and the exhaust smoke temperature is below 1000° C.

3. The pot furnace for calcining petroleum coke at low temperature according to claim 1, characterized in that preheated air within the furnace bottom cooling channel is discharged directly, without participating in supporting the combustion in the flame path.

4. The pot furnace for calcining petroleum coke at low temperature according to claim 1, characterized in that the negative pressure in the main flue reaches −250 Pa~−300 Pa, the negative pressure in the eighth flame path layer reaches −120 Pa~−150 Pa, and the negative pressure in the first flame path layer reaches −30 Pa~−40 Pa.

* * * * *